United States Patent Office
3,387,441
Patented June 11, 1968

3,387,441
SUGAR CANE HARVESTERS
Roland A. Robichaux, Courthouse Bldg.,
Thibodaux, La. 70301
Filed Aug. 19, 1965, Ser. No. 481,143
15 Claims. (Cl. 56—238)

This invention relates to sugar cane harvesters, and more particularly, to a method and an improved device for use with a sugar cane harvester.

In the usual sugar cane harvester a cutting blade is provided which operates in a manner to sever the green leafy top portions of the sugar cane which are discarded and not used in processing the cane. However, the problem with such harvesters is that the canes are not all of the same height, and as a result the canes are not all of the same height, and as a result the canes which are shorter than the height at which the cutter is set will not be topped and as a result will pass through the harvester untopped, still in unusable condition for furthering processing of the cane. In present harvesters, the only way to correct this failure to cut the shorter canes is to lower the cutter and run the harvester over the same area in order to top the shorter canes. It can be seen, therefore, that the number of times the harvester must pass over the same field can be multiplied many times because of the variations of the height of the canes. Therefore, it is the purpose of this invention to provide in a sugar cane harvester means for topping the shorter canes as well as the taller ones in one pass over a given area. With the provision of such an improvement, the number of times a harvester must pass over a given area is greatly reduced. In fact, generally only one pass over the area will be necessary, and in addition, by topping all of the stalks at the same time, the entire crop will be ready for processing as soon as the machine has passed over a given area without the need for resetting the cutter and passing over the area again in order to top the shorter canes.

It is therefore the purpose of this invention to provide a method and an improvement for use with a sugar cane harvester which comprises a primary cutter, set at such a height as to top most of the cane stalks, and means disposed in cooperative relationship with the primary cutter for topping the shorter canes which passed under the primary cutter and yet leaving unaffected the majority of stalks of cane which were topped by the primary cutter, so that all the stalks of cane, both tall and short, can be topped at the same time by one pass of the harvester over a given area.

It is therefore an object of this invention to provide a method and apparatus for use with a sugar cane harvester which overcomes the disadvantages of the prior art.

Another object of the present invention is to provide an improved method for the topping of sugar cane.

A further object of the present invention is to provide means in a sugar cane harvester for topping sugar cane stalks of varying height in one pass of the harvester over a given area.

With these and other objects in view, as will hereinafter more fully appear, and which will be more particularly pointed out in the appended claims, reference is now made to the following description taken in connection with the accompanying drawings in which:

Figure 1:
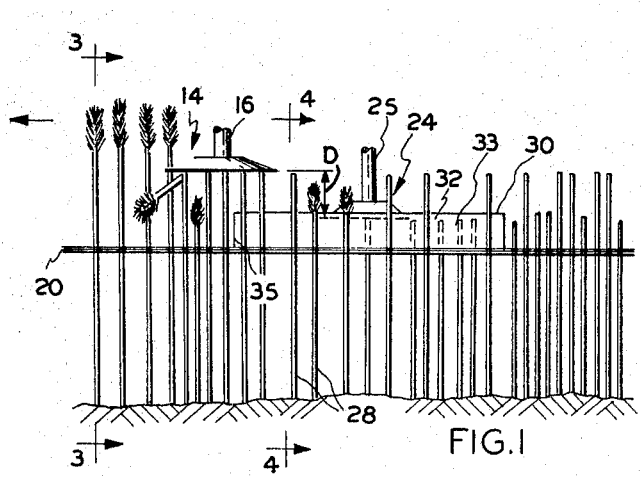
FIGURE 1 is a view of the apparatus of the present invention in its environment.

Considered from one aspect, the present invention involves a known type of sugar cane harvester composed of a mobile frame, cane topping means affixed to the mobile frame for severing the tops of sugar cane stalks, and conveying means mounted on the mobile frame for directing sugar cane stalks into the path of the topping means, the improvement in the cane topping means comprising:

(a) A first moving blade adapted to be mounted on said mobile frame at a spaced distance above the ground, (b) A second moving blade adapted to be mounted on said mobile frame, (c) Said second moving blade being positioned rearwardly of said first moving blade and positioned closer to the ground than said first moving blade, (d) Said first moving blade and said second moving blade being positioned generally along and above a portion of the path traversed by said conveying means, (e) A cane stalk guide means adapted to be mounted on said mobile frame closely adjacent to said first and second moving blades, (f) At least a portion of said cane stalk guide means being disposed angularly with respect to a straight line between said first and second moving blades, (g) Whereby at least a portion of the sugar cane stalks severed by said first moving blade will be guided out of the path of said second moving blade.

There are a number of sugar cane harvesters which are in use today and which have been patented. These harvesters include a cutter, a conveyor and a mobile frame. The following patents illustrate such harvesters: Patent Nos. 3,025,653, 2,958,175, 2,505,952 and 976,823.

The particular improvement of this invention can be utilized with almost any sugar cane harvester. Broadly this invention involves apparatus for topping sugar cane stalks of different heights in one pass of the harvester over a given area.

Since the improvement embodied in this invention relates to apparatus which could be used on almost any prior art sugar cane harvester, the drawings only show the specific apparatus and not the entire harvester.

Referring now to the drawings, wherein like reference characters designate like or corresponding parts throughout the several views, there is shown a portion of a sugar cane harvester embodying the present invention. The present invention may be provided in a sugar cane harvester as is shown in Patent Nos. 3,025,683, 2,958,175, 2,505,952 and 976,823 having a mobile frame, cane topping means affixed to the mobile frame for severing the tops of sugar cane stalks and conveying means mounted on the mobile frame for directing sugar cane stalks into the path of the topping means. The improvement embodied in the present invention resides in the cane topping means.

Figure 2:
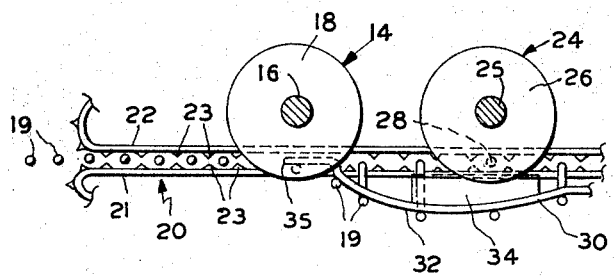
FIGURE 2 illustrates a top view of the invention shown in FIGURE 1.

As can be seen in FIGURES 1 and 2 there is a first moving blade or primary cutter 14 adapted to be mounted on the mobile frame at a spaced distance above the ground. The first moving blade 14 includes an axis of rotation defined by a shaft 16 and a cutting edge 18, the cutting edge 18 being set at a predetermined height so as to top the green leafy portions of the tops of the majority of stalks 19 of cane in a given field. The majority of stalks in a given row will generally be of such height that the moving blade 14 will properly top these stalks of cane, but there will be a number of shorter canes which will not be affected by the first moving blade 14 and will thus pass under the cutting edge 18 of the first moving blade 14 without being topped.

In addition to the first moving blade 14 the usual sugar cane harvester is provided with a conveying means such as that illustrated by 20 which consists of two parallel disposed carrier chains 21 and 22. Each carrier chain has prongs 23 which are provided at spaced intervals and which cooperate in such manner when the carrier chains 21 and 22 come together so as to grasp the cane stalks. As the harvester passes over a row of sugar cane stalks each stalk will be disposed between the prongs 23 of the carrier chains 21 and 22 such that they will be aligned in a single row one behind the other and moved along in one direction successively in the conveying means 20 toward the moving blade 14.

A second moving blade or secondary cutter 24 is provided being adapted to be mounted on the mobile frame and having an axis of rotation defined by a shaft 25 and a cutting edge 26 and being disposed in such relation to the first moving blade 14 of the sugar cane harvester as to top the shorter stalks of cane indicated by 28 which were not properly topped by the first moving blade 14.

The second moving blade 24 is positioned rearwardly of the first moving blade 14 and is positioned closer to the ground than the first moving blade 14. In the sugar cane harvester the first moving blade 14 is set at a predetermined height determined by the height of the majority of the sugar cane stalks to be cut. Once the setting of the height of the first moving blade 14 has been accomplished, the second moving blade 24, which is adjustable in height, is positioned such that its cutting edge 26 is disposed four to six (4–6) inches below the horizontal plane in which the cutting edge 18 of the first moving blade 14 is disposed. This relationship is shown by the distance D in FIGURES 1 and 3.

Figure 5:
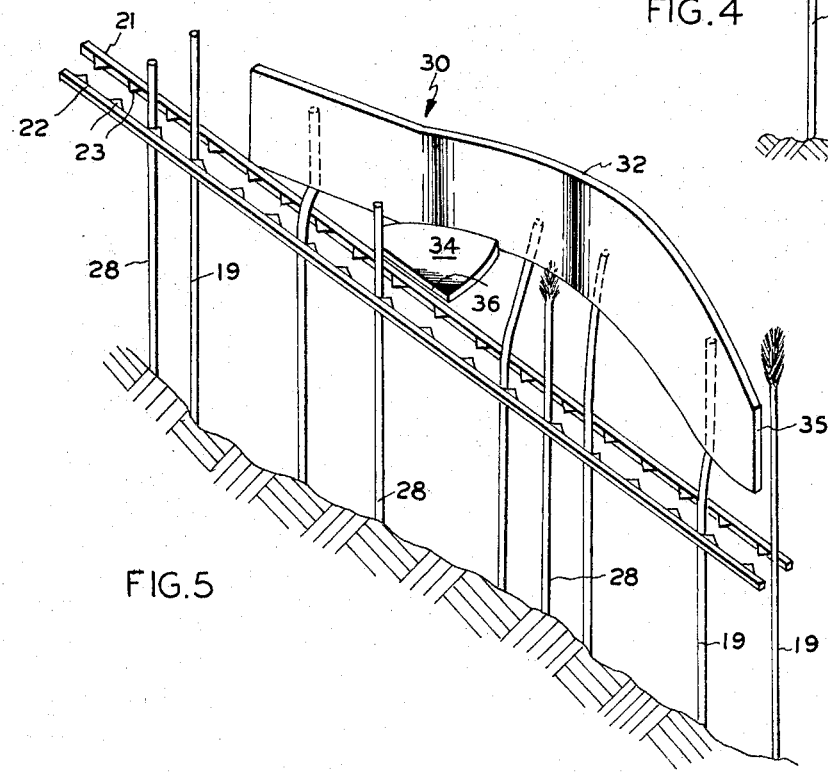
FIGURE 5 is an isometric view of a portion of the present invention.

As can be seen from FIGURE 5 the stalks of sugar cane, both the taller ones and the shorter ones indicated by 19 and 28 respectively, are carried by the conveying means 20 past both the first moving blade 14 and the second moving blade 24, which are positioned along and above a portion of the path traversed by the conveying means 20. The shafts 16 and 25 lie in a vertical plane which is parallel to the path traversed by the conveying means 20.

Mounted on the mobile frame of the harvester closely adjacent the first and second moving blades 14 and 24 respectively is a cane stalk guide 30 including an outer guard 32 and an inner guard 34. The guide 30 lies entirely below the horizontal plane formed by the cutting edge 18 of the first moving blade 14 but above the conveying means 20. The outer guard 32 has a vertical face 33 which is situated adjacent the cutting edge 26 of the second moving blade 24. The inner guard 34 is fixed to the bottom edge of the vertical face 33 of the outer guard 32 and lies in a generally horizontal plane between the outer guard 32 and the vertical cylindrical surface in which the outer circumference of the cutting edge 26 of the second moving blade 24 lies. While the preferred embodiment of the invention shows the inner guard 34 it is not absolutely essential that an inner guard be provided for the operation of the device.

The outer guard 32 has a front edge 35 which lies directly above the carrier chain 22 and a distance below the cutting edge 18 of the first moving blade 14. From the front edge 35 of the outer guard 32 curves out over the carrier chain 21 and continues past the vertical plane in which the carrier chain 21 lies. Thus, the outer guard 32 is positioned angularly with respect to the parallel paths formed by the vertical plane in which the shafts 16 and 25 lie and the path traversed by the conveying means 20. The outer guard 32 curves around the cutting edge 26 of the second moving blade 24. Once the outer guard 32 is beyond the second moving blade 24, it curves back towards the conveying means 20.

As best seen in FIGURE 5 the purpose of the outer guard 32 is to deflect the majority of stalks 19 which have been properly topped by the first moving blade 14 around the outer edge of the outer guard 32 so as to be unharmed by the operation of the second moving blade 24. However, the shorter stalks 28 remain unaffected by the first moving blade 14 and therefore pass around or under the inner edge of the outer guard 32 because of the weaker joints in the shorter stalks 28. Because the smaller stalks 28 are shorter, they are not as fully grown and do not have the joint strength of the taller stalks 19 and therefore either will be too short or will not be able to pass around the outer edge of the outer guard 32. Since the shorter stalks 28 are unable to pass around the outer guard 32 they will continue on toward the second moving blade 24 until they reach the inner guard 34 which is disposed between the outer guard 32 and the plane cylindrical surface formed by the outer edge of the cutting blade 26 of the second moving blade 24.

Figure 3:
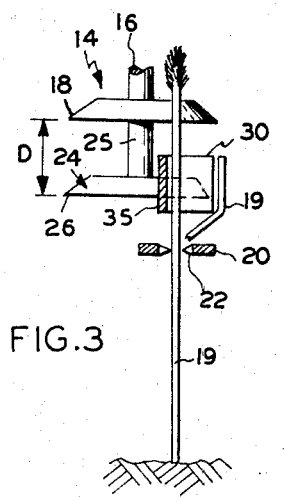
FIGURE 3 is a side view of the invention taken along the lines 3—3 of FIGURE 1.
Figure 4:
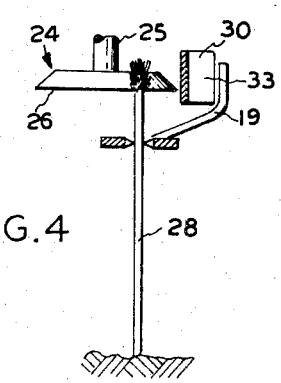
FIGURE 4 is a side view of the invention taken along the lines 4—4 of FIGURE 1.

Upon reaching the inner guard 34 the shorter stalks 28 will pass along the inner edge 36 (shown in dotted line in FIGURE 2) of the inner guard 34, thus insuring that as the shorter stalks 28 pass the cutting edge 26 of the second moving blade 24 they will be properly topped. Thus, upon the shorter stalks 28 coming into contact with the second moving blade 24 they will have been properly topped and the taller stalks 19 which had been properly topped by the first moving blade 14 will have passed around the outer guard 32 and upon having passed the guide means 30 they will be returned to their undeflected position. Thus upon passage of both the taller stalks 19 and the shorter stalks 28 along the conveying means 20 past the second moving blade 24 all the stalks will have been properly topped and be in condition for further processing. FIGURES 3, 4 and 5 illustrate the manner in which the taller stalks 19 are deflected around the outer edge of the outer guard 32 while the shorter stalks 28 remain on the inside of the outer guard 32.

It should be understood, of course, that the foregoing disclosure relates to only a preferred embodiment of the invention and that numerous modifications or alterations may be made therein without departing from the spirit and scope of the invention as set forth in the appended claims.

What is claimed is:

1. In the known type of sugar cane harvester composed of a mobile frame, cane topping means affixed to the said mobile frame for severing tops of sugar cane stalks, and conveying means mounted on said mobile frame for directing sugar cane stalks into the path of said topping means, the improvement in said cane topping means comprising:
    (a) a first moving blade adapted to be mounted on said mobile frame at a spaced distance above the ground,
    (b) a second moving blade adapted to be mounted on said mobile frame,
    (c) said second moving blade being positioned rearwardly of said first moving blade and positioned closer to the ground than said first moving blade,
    (d) said first moving blade and said second moving blade being positioned generally along and above a portion of the path traversed by said conveying means,
    (e) a cane stalk guide means adapted to be mounted on said mobile frame closely adjacent to said first and second moving blades,
    (f) at least a portion of said cane stalk guide means being disposed angularly with respect to a straight line between said first and second moving blades,
    (g) whereby at least a portion of the sugar cane stalks severed by said first moving blade will be guided out of the path of said second moving blade.

2. In the known type of sugar harvester as set forth in claim 1 wherein said first and second moving blades have their axes lying in a vertical plane which is parallel to the vertical plane in which the conveying means lies.

3. In the known type of sugar cane harvester as set forth in claim 2 wherein said cane stalk guide means comprises an outer guard for deflecting the stalks topped by the first moving blade while leaving undeflected the untopped stalks and an inner guard integrally connected with the outer guard and being closely adjacent only the second moving blade for forcing the stalks which were not severed by the first moving blade against the second moving blade to insure proper severance.

4. In the known type of sugar cane harvesters as set forth in claim 3 wherein said second moving blade is disposed 4 to 6 inches below said first moving blade.

5. In a sugar cane harvester having a primary cutter for topping the cane stalks which can be adjusted to top cane stalks of various heights and a conveyor for moving the stalks past the primary cutter in a single line, the improvement which comprises: means disposed rearwardly of the primary cutter for topping the shorter stalks which were not topped by the operation of the primary cutter and for leaving unaffected the stalks which were topped by the operation of the primary cutter.

6. In a sugar cane harvester having a primary cutter for topping the cane stalks, said primary cutter being adjustable to top stalks of varying height and a conveyor for moving the stalks past the primary cutter in successive fashion, the improvement which comprises:
  (a) cane stalk guide means attached to the harvester adjacent the conveyor and in such cooperative relation with said conveyor that the stalks which were topped by the primary cutter are deflected while the shorter untopped stalks are undeflected;
  (b) cutting means for topping the shorter stalks which were not topped by the primary cutter, said cutting means being disposed rearwardly of and slightly below the primary cutter so that when in operation said cutting means will top said shorter untopped stalks while it leaves unaffected the stalks properly topped by the primary cutter.

7. In a sugar cane harvester as set forth in claim 6 wherein said guard means comprises an outer guard for deflecting the stalks topped by the primary cutter while leaving undeflecting the untopped stalks and an inner guard for insuring that the shorter untopped stalks are properly topped by said cutting means.

8. In a sugar cane harvester as set forth in claim 7 wherein said cutting means comprises a secondary cutter having an axis disposed in the same vertical plane as the axis of the primary cutter, said secondary cutter having a cutting blade which is disposed slightly below the horizontal plane formed by the cutting blade of said primary cutter.

9. In a sugar cane harvester as set forth in claim 8 wherein the cutting blade of said secondary cutter is disposed approximately 4 to 6 inches below the cutting blade of said primary cutter.

10. In a sugar cane harvester as set forth in claim 6 wherein said cutting means comprises a secondary cutter having an axis disposed in the same vertical plane as the axis of the primary cutter, said secondary cutter having a cutting blade which is disposed slightly below the horizontal plane formed by the cutting blade of said primary cutter.

11. In a sugar cane harvester as set forth in claim 10 wherein the cutting blade of said secondary cutter is disposed approximately 4 to 6 inches below the cutting blade of said primary cutter.

12. A method of topping sugar cane stalks and the like having heads on the upper portions of said stalks, which comprises:
  (a) moving the stalks along in one direction successively;
  (b) topping successively the taller stalks;
  (c) deflecting the upper portions of the topped stalks while the upper portions of the shorter untopped stalks remain undeflected;
  (d) topping the shorter untopped stalks whose upper portions were undeflected; and
  (e) leaving the topped stalks whose upper portions were deflected unaffected by the topping of the shorter stalks.

13. A method of topping sugar cane stalks and the like having heads on the upper portions of said stalks, which comprises:
  (a) moving the stalks along in one direction successively one behind the other;
  (b) topping the heads of successive taller stalks;
  (c) deflecting the upper portions of the topped stalks while the upper portions of the shorter untopped stalks remain undeflected;
  (d) topping the heads of the shorter stalks whose upper portions were undeflected; and
  (e) leaving the upper portions of the topped stalks whose upper portions were deflected unaffected by the topping of the heads of the shorter stalks.

14. In a method of topping sugar cane stalks and the like, said stalks having green leafy upper portions;
  (a) moving the stalks along in one direction successively;
  (b) topping the green leafy upper portions of successive taller stalks;
  (c) deflecting the remainder of the upper portions of the topped stalks while the upper portions of the shorter untopped stalks remain undeflected;
  (d) topping the green leafy upper portions of the shorter untopped stalks whose upper portions were undeflected; and
  (e) leaving the remainder of the upper portions of the topped stalks whose upper portions were deflected unaffected by the topping of the green leafy upper portions of the shorter stalks.

15. In a method of topping sugar cane stalks and the like, said stalks having green leafy upper portions;
  (a) moving the stalks along in one direction successively;
  (b) topping the green leafy upper portions of successive stalks which are of one height;
  (c) deflecting the remainder of the upper portions of the topped stalks while the upper portions of the shorter untopped stalks remain undeflected;
  (d) topping the green leafy upper portions of the shorter untopped stalks whose upper portions were undeflected;
  (e) leaving the remainder of the upper portions of the topped stalks whose upper portions were deflected unaffected by the topping of the green leafy upper portions of the shorter stalks; and
  (f) returning all the topped stalks to their originally undeflected positions.

References Cited

UNITED STATES PATENTS

| | | | |
|---|---|---|---|
| 2,300,063 | 10/1942 | Romine | 171—29 X |
| 2,636,331 | 4/1953 | Price. | |
| 2,956,628 | 10/1960 | Rogers et al. | 171—60 |
| 2,958,175 | 11/1960 | Sprinkle | 56—25.4 |
| 3,025,653 | 3/1962 | Ackermann | 56—53 |
| 3,178,871 | 4/1965 | Nothnagel | 56—23 |

ANTONIO F. GUIDA, *Primary Examiner.*